United States Patent

[11] 3,616,080

| [72] | Inventor | George S. Nalle, Jr.<br>108 W. 2nd St., Austin, Tex. 78701 |
|---|---|---|
| [21] | Appl. No. | 336,851 |
| [22] | Filed | Dec. 27, 1963 |
| [45] | Patented | Oct. 26, 1971 |

[54] APPARATUS FOR EXTRUSION OF STRENGTHENED PLASTIC NETTING
11 Claims, 9 Drawing Figs.

[52] U.S. Cl. .................................................. 156/500,
    18/12, 156/167, 156/244, 264/167
[51] Int. Cl. .................................................. B29b 5/04
[50] Field of Search.......................................... 156/167,
    244, 441, 500; 18/12 N, 13 R, 14 R; 101/5 BV;
    161/DIG. 6; 264/167

[56] References Cited
UNITED STATES PATENTS

| 3,228,063 | 1/1966 | Gutierrez ...................... | 18/12 N |
| 2,871,516 | 2/1959 | Sherman et al. ............... | 156/244 |
| 2,919,467 | 1/1960 | Mercer.......................... | 156/167 X |
| 3,067,084 | 12/1962 | Nalle, Jr. ...................... | 156/167 |
| 3,217,360 | 11/1965 | Mason et al. ................. | 18/5 B |
| 3,234,071 | 2/1966 | Ward et al. ................... | 18/14 R |

Primary Examiner—Philip Dier
Attorney—Arnold, Roylance, Kruger and Durkee

ABSTRACT: A method and apparatus for extruding strengthened plastic filaments of elongated cross section under increased pressurization as die holes are aligned and so as to intersect the extruded strands in a substantially oxygen-free environment.

INVENTOR.
GEORGE S. NALLE, JR.
BY
Semmes and Semmes
ATTORNEYS

INVENTOR.
GEORGE S. NALLE, JR.

BY
Semmes and Semmes
ATTORNEYS 3,616,080

APPARATUS FOR EXTRUSION OF STRENGTHENED PLASTIC NETTING

The present invention relates to a method and apparatus for extrusion of strengthened plastic netting and to novel products produced thereby.

More particularly the invention is concerned with the method for extruding netlike structures of the type disclosed in applicant's U.S. Pat. No. 3,067,084, yet having strengthened welds. Such plastic rectiform products essentially comprise a pair of series of monofilaments or strands, the strands of each series of which, sequentially of extrusion, intersect the strands of the other series at spaced intervals and are autogenously bonded, integrated or welded at the points of intersection to form an integral reticulated tubular structure.

A major desideratum in such netlike plastic structures is the establishment of a strong bond or weld at the intersecting areas of the monofilaments constituting the structure.

As pointed our in U.S. Pat. No. 3,067,084, the expedient of intersecting the strands apart from the diehead, while eliminating clogging of plastic material in the diehead, has resulted for several reasons in a less perfect weld. According to the present method, improved and strengthened welds are developed upon strands intersecting apart from the diehead. This present method includes the following coordinated steps:

increasing pressurization upon the extrudable plastic mass as the die holes are aligned, extruding the plastic mass in strands of elongated cross section and intersecting the extruded strands in a substantially oxygen-free environment.

The increasing pressurization insures that a larger plastic mass is available at the point of intersection or weld. The extruding of the strands in elongated cross section provides a greater area of contact between strands at the point of intersection or weld. And the intersecting of strands in an oxygen-free environment inhibits weakening oxidation of the strands at the weld.

Accordingly, it is an object of invention to provide a method for extrusion of plastic netting having strengthened welds.

Another object of the invention is to provide a method for increasing the strength of the welds in a plastic rectiform structure by so shaping the cross section of the extruded filaments so as to provide a greater area of contact from one filament to another in the structure.

Yet an additional object is to provide a method for extrusion of plastic netting in which oxidation of the as-extruded material is considerably minimized as compared to conventional extrusion methods.

Another object of the invention is to produce plastic reticular structures which are characterized by a strength in the welds or intersection areas of the structure considerably greater than conventional products currently produced.

Another object of the invention is to devise an extrusion head apparatus, which may readily be attached to or associated with conventional net extrusion and which is operable to momentarily increase the pressure on the hot plastic at given intervals as it passes through the die orifices of the extrusion head.

Yet another object of the invention is to provide a diehead particularly adapted for the production of integral plastic net structures in which means are provided to increase the pressure of the plastic at the moment the monofilaments comprising the netting material are merged and integrated to form the intersecting areas of the material.

Currently employed apparatus for the production of plastic netting tubes such, for example as that disclosed in U.S. Pat. No. 3,067,084 comprise essentially a diehead associated with an extrusion tube which head is provided with juxtaposed dies, each die having a series of die orifices which are relatively rotatable and which are so designed as to insure the extrusion of plastic filaments adapted to merge and consolidate with each other at desired intervals to form a continuous integral net tube.

Additional objects of the invention will become apparent from the ensuing specification and attached drawings wherein.

Figure 1:
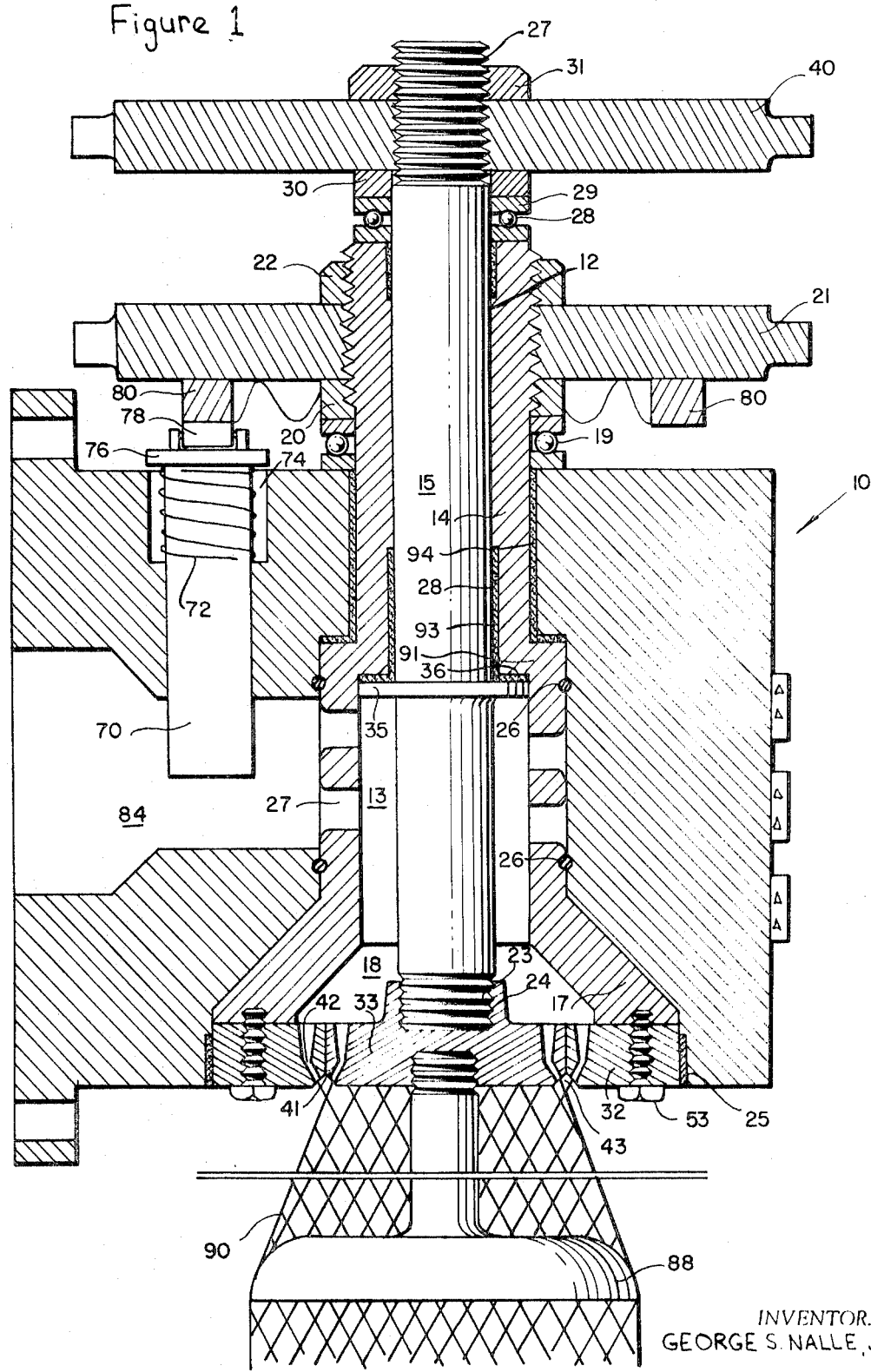
FIG. 1 is a vertical sectional view of a suggested contrarotating die crosshead.
Figure 2:
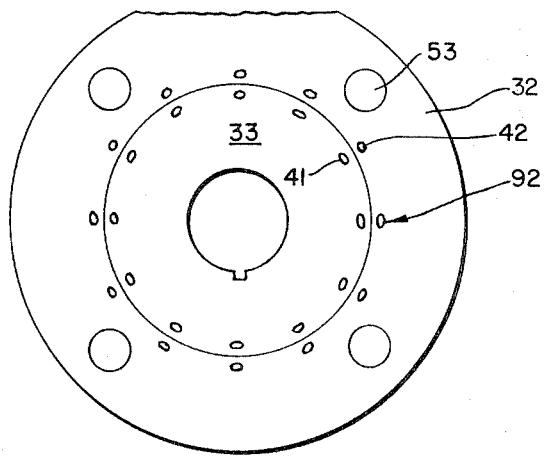
FIG. 2 is a bottom plan view of one form of die which may be employed in the extrusion.

In the drawings there is shown the structure of suggested contrarotating crosshead wherein the novel operations contemplated by the invention are effectuated. It will be understood that this is adapted to be secured to the barrel of any conventional extruder (not shown), the continuously revolving screw of which feeds the heated and softened plastic through a screen and breaker plate into the die crosshead. As is shown particularly in FIG. 1, the diehead, indicated generally at 10 is formed with a channel 12, which communicates with a chamber or cavity 13, is designed to receive two concentric spindles or shafts 14, 15 which are connected respectively to closely juxtaposed die plates 32 and 33, to rotate such plates in opposite directions.

As shown in FIG. 1, hollow shaft 14 encloses an enlarged central shaft 15 formed with median shoulder 35. Shaft 14 has lower frustoconical section 17 interiorly defining an enlarged hot-melt-receiving cavity 18 directly communicating with chamber 13. The upper section of shaft 14 is externally screw threaded and is supported on the diehead 10 by antifriction thrust bearing 19 and lock nut 20 which is screw threaded on the shaft. As will be seen in FIG. 1, shaft 14 receives a special chain sprocket 21 which is securely locked to the shaft by any suitable means such as lock nut 22.

As will be seen in FIG. 1, shaft 15 at its lower portion 23 fits within a correspondingly conformed annular groove 24 in the die block 33. A bearing 25 is interposed between diehead 10 and the lower face of shaft 14. O-rings 26 are fitted between the diehead midsection and shaft 14 to prevent leakage of the hot plastic melt.

Shaft 14 is formed with a central cylindrical section having ports 27 communicating with chamber 84. As will be observed from the construction of FIG. 1, hollow shaft 14 is formed with a shouldered midportion 21. Suitable bushings 94 and 93 are provided between the body of the diehead and shaft 14, as well as between shafts 14 and 15.

Figure 3:
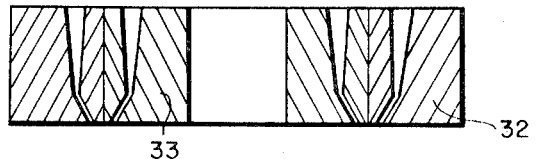
FIG. 3 is a vertical section of the die shown in FIG. 2.
Figure 4:
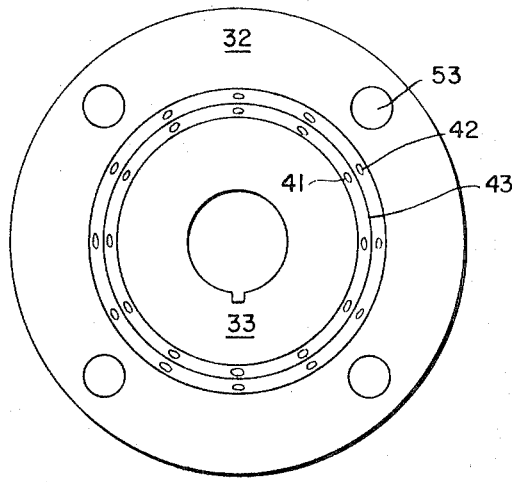
FIG. 4 is a bottom plan view of a modified form of die wherein the extrusion holes are recessed within an annular groove or notch.

The die plate assembly includes a die plate 32 secured as by means of capscrews 53 to the lower face of the flared out or lower truncated portion 17 of shaft 14. As will be seen in FIGS. 1 and 3, die plate 32 is provided with a central circular opening within which fits a concentrically positioned and cooperating die plate 33 which is of the same thickness as die plate 32 and is horizontally aligned therewith. Die plate 33 is adapted to be secured in any suitable manner as by means of the screw-threaded engagement shown to the lower end 23 of shaft 15, as set forth above.

At its median portion shaft 15 is provided with a shoulder 35, in complemental dimensions to the shoulder flange 36 on the inner portion of shoulder 91 and similarly adapted to receive bushing 93. The central spindle or shaft 15 extends vertically through and beyond hollow shaft 14 and at its upper portion terminates in a screw-threaded section 27. Shaft 15 is supported on the assemblage through the medium of the roller thrust bearings 28 and thrust ring 29. A washer 30 or similar collar may be positioned atop thrust ring 29. As will be observed, sprocket wheel 50 is secured on the threaded upper extension 27 of shaft 15 and is locked in position by means of the locknut 31.

Figure 5:
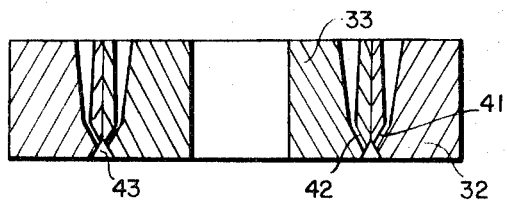
FIG. 5 is a vertical section of the die shown in FIG. 4.

As previously mentioned, one of factors that contributes to a weakening of the extruded netting bond at the welded or coalesced areas of the netting is surface oxidation of the hot plastic. According to one aspect of the invention, the strength of the bond or weld in net structures can be measurably improved by designing the die elements to minimize access of oxygen to the filaments at the time and point of intersection of such filaments. A suitable method of achieving this advantage of reduced oxidation effect with consequent improvement in the weld is shown in FIGS. 1 and 5. It is there shown that the bottom inner surface of die member 32 terminates in a convergent wall section and, correspondingly, the bottom inner face of die member 33 terminates in a divergent wall section. Thus die member 33 divergent extrusion holes 41 and die member 32 convergent extrusion holes 42 terminate in a confined notch or V 43 which tends to reduce access of air to the apex of the V, that is at the point of welding contact, thus insuring a strengthened bond which is considerably less subject to the deleterious effects of oxidation.

Figure 6:
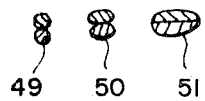
FIG. 6 illustrates schematically in cross section, respectively an orthodox filament of circular cross section and the several different types of strand welds of elongated or ellipsoidal cross section produced according to the invention.

A further aspect of the invention is to increase the strength of the welds by conforming the cross section of the individual filaments so as to insure a greater area of bonding contact between one filament and another. This may be achieved by shaping the extrusion orifices of the die plates so as to produce ellipsoidal-shaped filaments 50 or semicircular filaments 51 as shown in FIG. 6. For purposes of illustration, the orthodox filaments of circular cross section are shown as 49 in FIG. 6.

Figure 7:
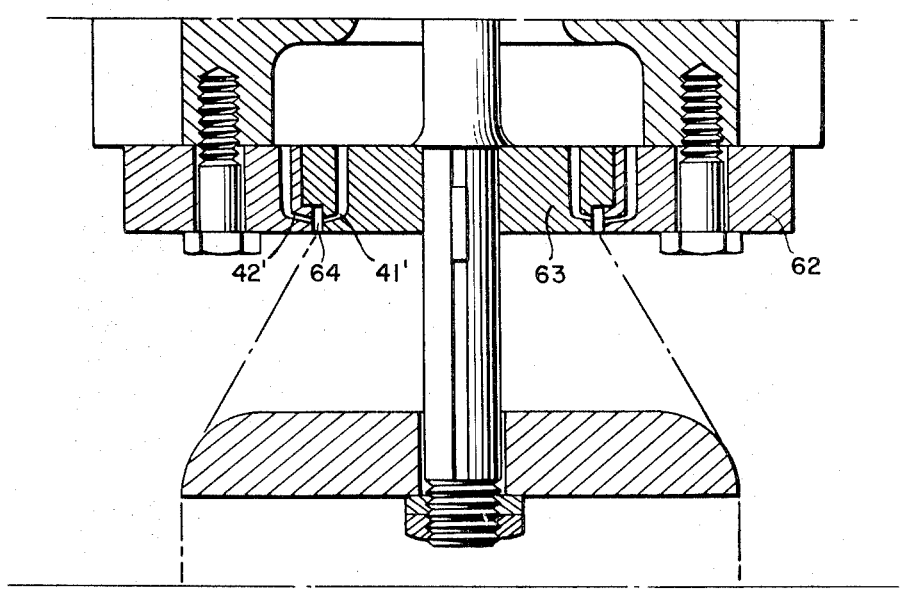
FIG. 7 is a partial cross-sectional view illustrating a modified die construction designed to give protection against oxidation of the extruded filaments, wherein the aligned extrusion holes are downwardly inclined with respect to each other.
Figure 8:
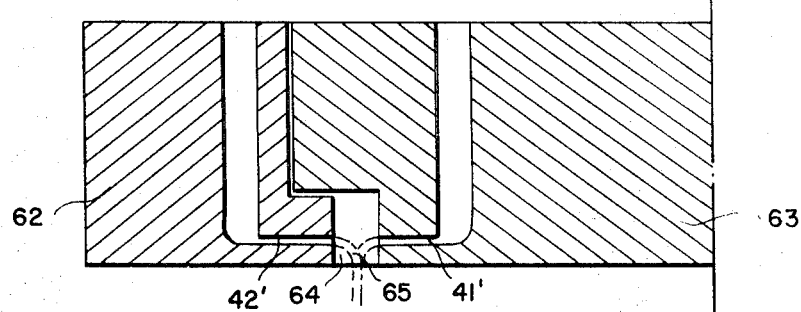
FIG. 8 is an enlarged sectional view of another modified die structure wherein the aligned extrusion holes are horizontally disposed with respect to each other.
Figure 9:
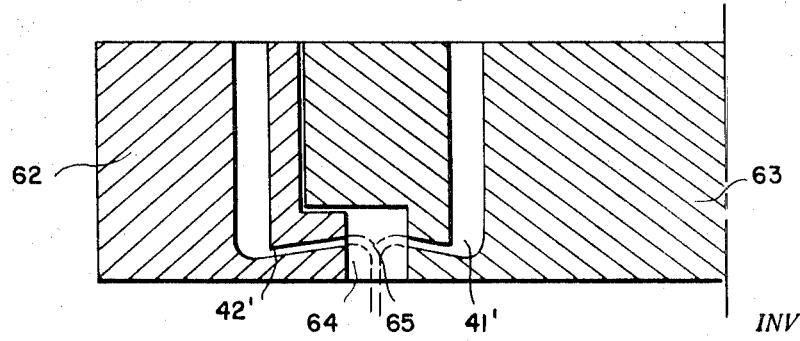
FIG. 9 is a view similar to FIG. 8 showing another modified die wherein the aligned extrusion holes are upwardly disposed with respect to each other.

Other specific designs of die elements may be employed to protect hot extruding filaments against oxidation, such, for example, as the ones shown in FIGS. 7, 8 and 9. In this die assembly the exterior circular die 62 and the interior circular die 63 are so designed as to provide an annular channel 64 into which the downwardly disposed opposing extrusion orifices or horizontally opposed extrusion orifices or upwardly disposed orifices open within channel 64 so that the extruded filaments are caused to overlie, weld or coalesce at point 65 within the substantially oxygen-free area of notch or channel 64.

The FIG. 9 assembly is generally similar to the design shown in FIG. 8 except that the extrusion orifices are opposed in a reverse angle. This is found to be less satisfactory than the designs of FIGS. 7 and 8 because it not infrequently results in extensive clogging of the notch or groove 64.

As stated previously a very effective method of improving the strength of the welded areas in net fabrics is to increase the pressure on the extruded plastic filaments by momentarily increasing the pressure of the plastic in the diehead at the precise or exact moment that the die holes are in cooperating registry to form the weld, releasing the increase in pressure after intersecting contact of the filaments has been made and repeating this pulsating pressure increase synchronously with recurrent registering or mating of the die holes throughout the process.

Such a recurrent extrusion pressure may be established in a number of ways, the apparatus of FIG. 1 being typical. As there shown, diehead 10 is recessed to tightly receive a piston 70 which is biased by means of the compression spring 72 seated within the enlarged area 74 and bearing against the bottom of an upper plate 76 positioned outside of diehead 10. Plate 76 mounts a cam follower 78 which is adapted to coact with the arcuate cam 80 positioned on the bottom of sprocket wheel 21. It will be observed that with this structure, as the sprocket wheel 21 rotates cam follower 78 remains pressed to cam 80 and piston 70 is reciprocated within the channel section 84 of the diehead. As piston 70 is forced downwardly on a given stroke, the soft plastic within the channel 84 tends to be reduced in volume or densified with a consequent increase in the pressure on the plastic and, since the plastic is in fluid state, such pressure is transmitted through the die cavity 84 and ports 27 to the plastic at the die apertures, 41 and 42. The cylindrical piston 70 may be provided with piston rings, not shown, to maintain the plastic within channel 84. While piston 70 has been shown as of cylindrical cross section, it will be readily understood that it may be formed in other shapes, as for example in streamline form so as not to impede unduly the flow of plastic from the screw (not illustrated) into the extrusion chamber. It will be understood that application of momentary pressure on the plastic may be achieved by other than hydraulic means. Thus, for example, diehead 10 may be provided with an expansible diaphragm which is periodically expanded and deflated in accordance with the positioning of the die orifices 41 and 42 as by means of a time control mechanism to expand and deflate the diaphragm by the introduction and withdrawal of a pneumatic fluid.

Rotary circular die 33 has loosely mounted thereon a spreader mandrel 88 which is formed with a circular periphery of substantial area and larger in diameter than the diameter of the extrusion circle 92 or series of extrusion holes 41 and 42. As will be understood, mandrel 88 is immersed in a coolant to cool and set the hot plastic filaments in the desired diameter of the tubular netting. The netting 90 within the coolant may be associated with takeup rolls or equivalent means to take up and support the fabric.

Manifestly, various modifications in the suggested apparatus may be employed without departing from the spirit and scope of invention as defined in the subjoined claims.

I claim:
1. Apparatus for producing plastic netting which comprises:
    a diehead;
    first and second relatively movable dies in said diehead, each of said dies having a plurality of plastic filament extrusion orifices;
    said dies defining a recess into which said extrusion orifices are directed, in which recess plastic contact occurs between streams of plastic issuing from said orifices of said first die and said orifices of said second die apart from the diehead in midair in an environment wherein access of air is reduced;
    said orifices of said first die being directed toward the orifices of said second die in a direction ranging from a downward to a horizontal to an upward direction;
    a plastic reservoir communicating with said extrusion orifices; and
    means to pressurize plastic through said extrusion orifices.
2. The apparatus of claim 1 for producing tubular netting wherein said first and second dies are circular and are concentrically rotatable about a single axis, disposed as an outer and inner die structure, and wherein said extrusion orifices are aligned concentrically in each of said dies.
3. The apparatus of claim 2 including a coolant beneath said die and means below said die in said coolant to move the filaments extruding from said orifices laterally to set the plastic in the desired diameter of the tubular netting.
4. The apparatus of claim 2 wherein said recess is defined by convergent and divergent wall sections in the inner edge of the outer die and the outer edge of the inner die.
5. The apparatus of claim 1 including a circular spreading mandrel in axial alignment with said dies.
6. The apparatus of claim 1 including means for increasing pressurization of said plastic when said orifices of said first die and said orifices of said second die are aligned.
7. The apparatus of claim 1 wherein said extrusion orifices of said first and second dies are downwardly inclined with respect to each other forming an obtuse angle therebetween.
8. The apparatus of claim 1 wherein said extrusion orifices are horizontally opposed.
9. The apparatus of claim 1 wherein said extrusion orifices are of semicircular cross section.
10. The apparatus of claim 1 wherein said extrusion orifices are of ellipsoidal cross section.

11. In a plastic mesh-producing machine, the combination of:
- a plurality of individually and relatively movable hot plastic extrusion dies, each having a plurality of spaced-apart plastic extrusion orifices provided with extruding open ends having extruding axes;
- said orifices being arranged in annular rows in each of said dies with all of said rows of all of said dies being concentric with each other;
- said open ends of said orifices of each die spaced from the respective open ends of the orifices of an adjacent one of said dies, said open ends of the orifices of one of said dies directed toward the open ends of the orifices of another of said dies to cause extrusion impingement and welding of hot plastic issuing therefrom with the hot plastic issuing from orifices of said one of said dies;
- said open ends of said orifices disposed such that said impingement and welding occurs outside said dies in free space;
- one of said rows of orifices of one die being directed axially parallel toward orifices of another of said dies, such that plastic issuing from said dies impinges in opposite directions to thereby form an efficient fusion weld of the hot plastic issuing from the orifices of another of said dies;
- first means for forcing hot plastic under pressure to each of said dies and through said orifices to form plastic filaments; and
- means for causing relative movement of said dies in a direction laterally of the extrusion axes of said orifices.